(12) United States Patent
Stickl

(10) Patent No.: US 11,598,303 B2
(45) Date of Patent: Mar. 7, 2023

(54) DRAWDOWN COMPRESSOR ASSEMBLY

(71) Applicant: Washington Gas Light Company, Springfield, VA (US)

(72) Inventor: Adam Stickl, Springfield, VA (US)

(73) Assignee: Washington Gas Light Company, Springfield, VA (US)

( * ) Notice: Subject to any disclaimer, the term of this patent is extended or adjusted under 35 U.S.C. 154(b) by 0 days.

(21) Appl. No.: 17/366,504

(22) Filed: Jul. 2, 2021

(65) Prior Publication Data
US 2022/0010761 A1    Jan. 13, 2022

Related U.S. Application Data

(60) Provisional application No. 63/049,399, filed on Jul. 8, 2020.

(51) Int. Cl.
| | |
|---|---|
| *F04B 49/22* | (2006.01) |
| *F04B 17/05* | (2006.01) |
| *F02M 69/54* | (2006.01) |
| *F02M 25/08* | (2006.01) |
| *F02M 37/00* | (2006.01) |
| *F04B 35/00* | (2006.01) |
| *F04B 49/24* | (2006.01) |

(52) U.S. Cl.
CPC ............ *F02M 69/54* (2013.01); *F02M 25/08* (2013.01); *F02M 37/0029* (2013.01); *F02M 37/0052* (2013.01); *F04B 17/05* (2013.01); *F04B 35/002* (2013.01); *F04B 49/225* (2013.01); *F04B 49/24* (2013.01)

(58) Field of Classification Search
CPC ...... F04B 35/004; F04B 178/06; F04B 49/22; F04B 49/225
USPC ............................ 123/2; 417/34, 36, 39, 364
See application file for complete search history.

(56) References Cited

U.S. PATENT DOCUMENTS

| | | | | |
|---|---|---|---|---|
| 4,437,813 A | * | 3/1984 | Ingram | F04B 39/06 96/182 |
| 4,486,148 A | * | 12/1984 | Battah | F04B 35/002 417/42 |
| 5,181,833 A | * | 1/1993 | Villa | F04B 17/06 417/234 |
| 5,203,680 A | * | 4/1993 | Waldrop | F04B 41/04 417/364 |
| 5,378,113 A | * | 1/1995 | Caldwell | F04B 35/002 417/364 |
| 6,205,793 B1 | * | 3/2001 | Schimp | F17C 13/004 62/46.1 |

(Continued)

*Primary Examiner* — Erick R Solis
(74) *Attorney, Agent, or Firm* — Stinson LLP

(57) ABSTRACT

A drawdown compressor assembly for recovering natural gas from a gas line includes a first tubing configured for connection to a first pipe of the gas line at a one end of the first tubing. A compressor is attached to an opposite end of the first tubing and configured to draw natural gas from the first pipe through the first tubing and into the compressor for being compressed by the compressor. A second tubing is connected to the compressor at one end of the second tubing and configured for connection to a second pipe of the gas line at an opposite end of the second tubing. Activation of the compressor draws the natural gas from the first pipe through the first tubing and delivers compressed natural gas to the second pipe through the second tubing.

20 Claims, 4 Drawing Sheets

(56) References Cited

U.S. PATENT DOCUMENTS

| | | | | |
|---|---|---|---|---|
| 8,662,863 | B2* | 3/2014 | Speir | F04B 53/16 |
| | | | | 417/364 |
| 11,067,046 | B2* | 7/2021 | Fáltén | F02M 21/0293 |
| 2002/0122727 | A1* | 9/2002 | Gaither | F04B 35/002 |
| | | | | 417/364 |
| 2006/0204909 | A1* | 9/2006 | Malm | F02D 41/003 |
| | | | | 431/115 |
| 2006/0207681 | A1* | 9/2006 | Purington | B09B 3/00 |
| | | | | 141/231 |
| 2009/0159355 | A1* | 6/2009 | Garwood | A23L 5/20 |
| | | | | 180/165 |
| 2010/0232985 | A1* | 9/2010 | Jensvold | B01D 53/268 |
| | | | | 417/364 |
| 2013/0284123 | A1* | 10/2013 | Foege | F17C 9/04 |
| | | | | 62/48.1 |
| 2014/0150753 | A1* | 6/2014 | Foege | F02D 19/027 |
| | | | | 220/749 |
| 2015/0176534 | A1* | 6/2015 | Malm | F02M 55/007 |
| | | | | 123/445 |
| 2016/0114876 | A1* | 4/2016 | Lee | F17C 7/04 |
| | | | | 62/48.1 |

* cited by examiner

DRAWDOWN COMPRESSOR ASSEMBLY

CROSS-REFERENCE TO RELATED APPLICATION

This application claims priority to U.S. Provisional Patent Application Ser. No. 63/049,399, filed Jul. 8, 2020, and which is hereby incorporated by reference in its entirety.

FIELD

This disclosure generally relates to a drawdown compressor assembly, and more particularly to a drawdown compressor assembly for recovering natural gas from a gas line to perform small scale gas recovery.

BACKGROUND

During regular maintenance and construction projects involving natural gas infrastructure, natural gas is released by venting to the atmosphere to bring infrastructure safely out of service. This practice is common in the industry due to the absence of regulation that would require these emissions to otherwise be mitigated. While venting the natural gas to atmosphere is standard practice, there exists a need to reduce and minimize greenhouse gas emissions. Although natural gas is considered a clean burning fuel, the need to lower unburned emissions during normal operations is increasing. The present disclosure provides a drawdown compressor and a process of recovering natural gas that satisfies this need.

SUMMARY

In one aspect, a drawdown compressor assembly for recovering natural gas from a gas line generally comprises a first tubing configured for connection to a first pipe of the gas line at a one end of the first tubing. A compressor is attached to an opposite end of the first tubing and configured to draw natural gas from the first pipe through the first tubing and into the compressor for being compressed by the compressor. A second tubing is connected to the compressor at one end of the second tubing and configured for connection to a second pipe of the gas line at an opposite end of the second tubing. Activation of the compressor draws the natural gas from the first pipe through the first tubing when the first tubing is connected to the first pipe and delivers compressed natural gas to the second pipe through the second tubing when the second tubing is connected to the second pipe.

In another aspect, a process of recovering natural gas from a gas line generally comprises drawing natural gas from a first pipe of the gas line through a first tubing. Compressing the natural gas with a compressor attached to the first tubing at an inlet of the compressor. Delivering the compressed natural gas to a second pipe of the gas line through a second tubing connected to an outlet of the compressor.

BRIEF DESCRIPTION OF THE DRAWINGS

Corresponding reference characters indicate corresponding parts throughout the drawings.

DETAILED DESCRIPTION

Figure 1:
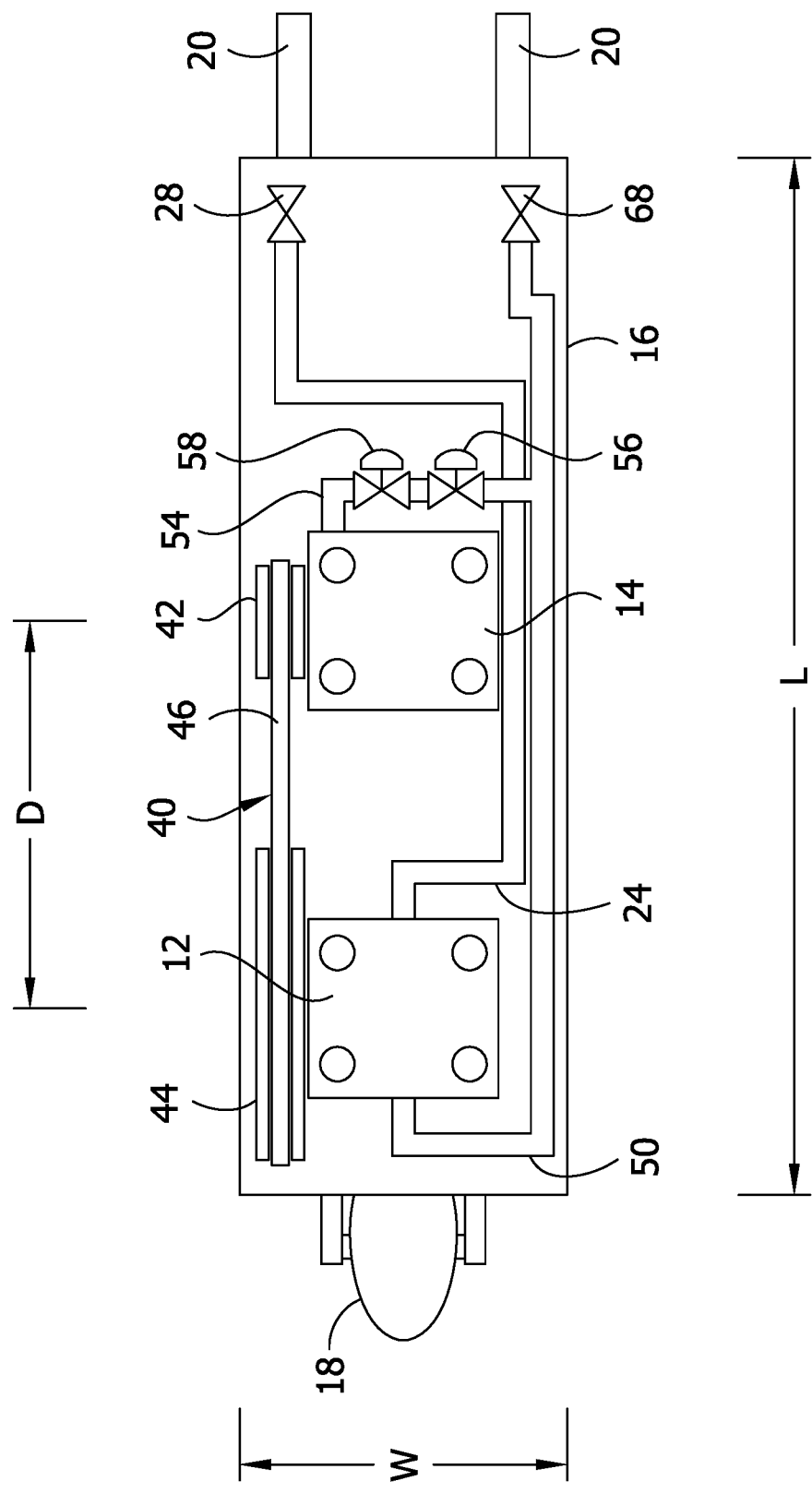
FIG. 1 is a schematic illustration of a drawdown compressor assembly of the current disclosure.
Figure 2:
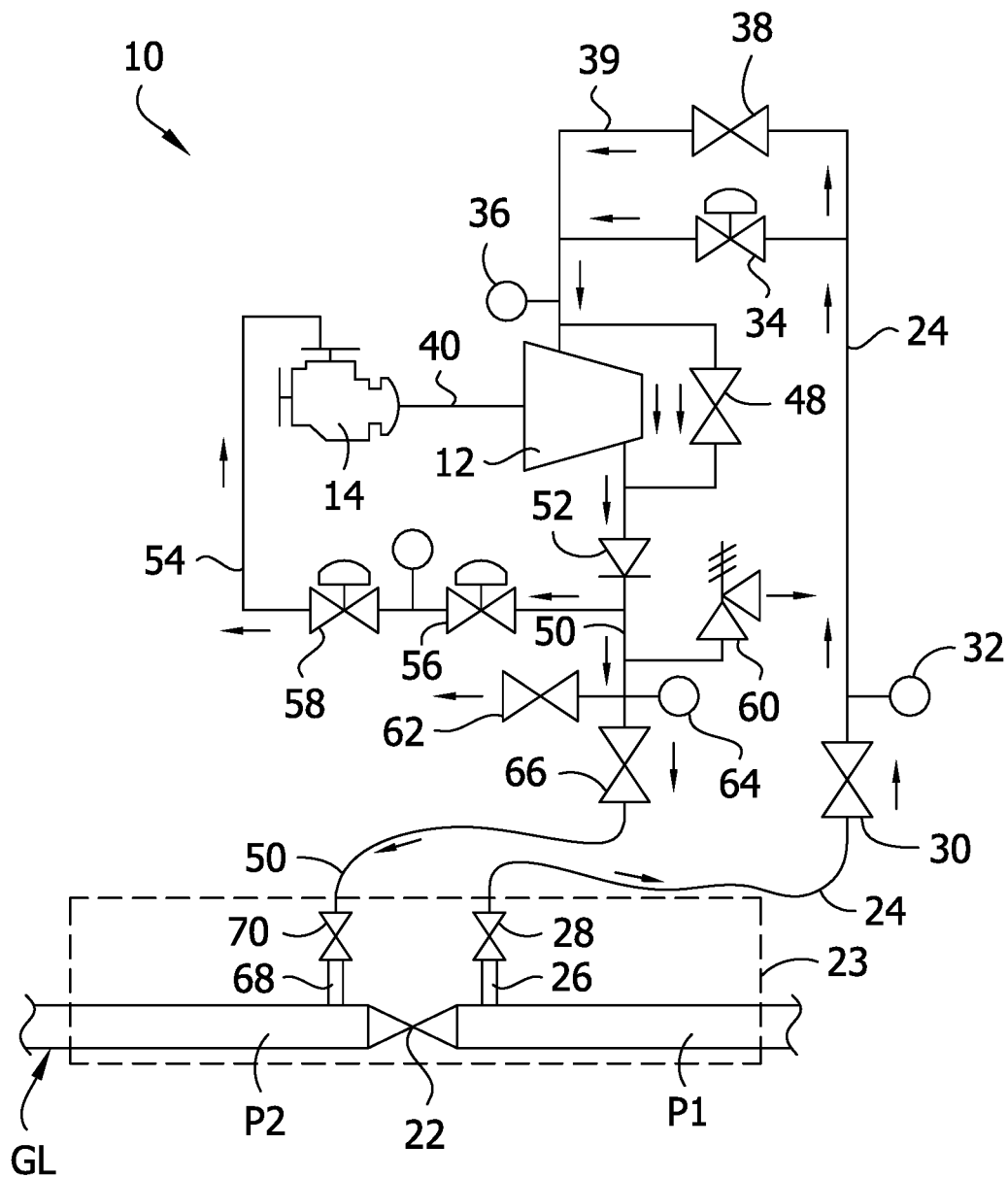
FIG. 2 is a schematic illustration of the drawdown compressor assembly connected to a gas line.

Referring to FIGS. 1 and 2, a drawdown compressor assembly is generally indicated at reference number 10. The drawdown compressor assembly 10 comprises a compressor 12 and a motor/engine 14 operatively connected to the compressor for driving the compressor. The drawdown compressor assembly 10 is configured for attachment to a gas line GL (FIG. 2) to recover natural gas (e.g., methane) from one pipe P1 of the gas line, compress the natural gas using the compressor 12, and deliver the compressed natural gas to another pipe P2 of the gas line. For instance, when the pipe P1 is being decommissioned, rather than expelling the natural gas from the pipe P1 to atmosphere, the gas is recovered and sent to a new or working pipe P2 thereby reducing greenhouse gas emissions as a result of the decommissioning process. Thus, the natural gas recovery process of the current disclosure substantially reduces the negative environmental effect of decommissioning a pipe within a gas line. The process also efficiently and economically preserves the usable natural gas within the gas line.

The drawdown compressor assembly 10 is a portable assembly such that the assembly can be moved by an individual to a desired location (e.g., construction site) for attachment to the gas line GL. Additionally, the assembly 10 is compact and sized and arranged such that a single person can transport the assembly. Accordingly, the assembly 10 is configured for use in small scale gas recovery operations. In the illustrated embodiment, the assembly 10 is configured as a "wheelbarrow" or "wagon" including a housing 16 at least partially enclosing the compressor 12, motor/engine 14, and other components of the assembly, a wheel 18 attached generally at a first end of the housing, and a pair of handles 20 attached to an opposite, second end of the housing. Thus, the assembly 10 is movable by an individual by lifting the housing 16 with the handles 20 and moving the assembly using the wheel 18 to a desired location. The assembly 10 may have other configurations without departing from the scope of the disclosure. For example, the components of the assembly 10 maybe be otherwise arranged and connected without being contained within a housing. Additionally or alternatively, the assembly 10 may be transported within a vehicle (e.g., car, truck, etc.) and removed from the vehicle and transported to the desired location for use. In one embodiment, the assembly 10 is configured for mounting to the back of a vehicle for transporting the assembly to the desired location. The assembly 10 may be constructed for mounting to other structures without departing from the scope of the disclosure.

The housing 16 of the drawdown compressor assembly 10 is substantially reduced in size from standard (i.e., large-scale and medium-scale) compressor assemblies. Additionally, the components of the assembly 10 are suitably sized and constructed to be enclosed or at least partially enclosed within the housing 16. Thus, rather than having to be held in fixed locations or transported in large 18-wheeler trucks, the assembly 10 is configured to be moved manually by a single individual or transported in small or mid-sized vehicles. In one embodiment, the housing 16 has a maximum length L of about 4 feet, a maximum width W of about 2 feet, and a maximum height of about 2 feet. The housing 16 can have other dimensions and/or configurations without departing from the scope of the disclosure. Additionally, in embodiments where a housing is omitted, the overall footprint of the assembly can be constructed and arranged such that is configured for portable small-scale gas recovery.

The compressor 12, engine/motor 14, and remaining components of the assembly 10 are suitably sized and constructed to be enclosed or at least substantially enclosed within the housing 16. In one embodiment, the compressor 12 is a standard air compressor that has been retrofit to function as a gas compressor. For example, the compressor 12 may be retrofitted with gaskets/seals as well as oil that is compatible with natural gas service. Therefore, it will be understood that the retrofit air compressor may be considered a gas compressor as it is suitable for compressing gas. The compressor 12 may have a rated outlet pressure of about 145 PSI and a maximum speed of about 1050 RPM. In one embodiment, the compressor 12 has a rated outlet gauge pressure of at least about 60 PSIG. The overall dimensions of the compressor 12 may include a length of less than about 12 inches, a width of less than about 12 inches, and a height of less than about 16 inches. It will be understood that compressors having other configurations and dimensions can be used without departing from the scope of the disclosure. In one embodiment, the engine/motor 14 is a common pull start gasoline engine. However, other types of engines could be used without departing from the scope of the disclosure. As will be explained in greater detail below, the gasoline engine/motor 14 is configured to run off the natural gas flowing through the assembly 10. Thus, the assembly 10 converts the gasoline engine 14 to run off natural gas. Additionally, reducing the size and capacity of the components of the assembly 10 requires a reconfiguration and arrangement of components to provide the necessary small-scale gas recovery functionality.

Referring to FIG. 2, in order to make the gas line GL safe for construction, and other uses such as maintenance and abandonment, the gas line is blown down to facilitate the release or removal of the natural gas from the line. This process creates an isolated condition within the gas line GL while maintaining static pressure within the pipe sections. In conventional practices, valve 22 of valve assembly 23 is open under normal operating conditions, and closed during isolation and venting events. In such venting events, valve 28 is opened to release the isolated line pressure to atmosphere. However, in the current disclosure, valve 22 is closed and suction tubing 24 (broadly, a first tubing) is configured to connect the drawdown compressor assembly 10 to pipe P1 of the gas line GL to draw the gas into the assembly. Thus, instead of releasing the gas from pipe P1 into the atmosphere through valve 28, the gas is removed from the pipe P1, processed through the assembly 10, and delivered to pipe P2. A gauge line 26 extends from the pipe P1 and provides a connection or tap point for the suction tubing 24 to connect the assembly 10 to the pipe P1. A gauge line valve 28 is disposed on the gauge line 26 and is operable to place the suction tubing 24 in fluid communication with an interior of the pipe P1 for drawing the gas out of the pipe. An optional block valve 30 is disposed along the suction tubing 24 adjacent the gauge valve 28 and may be used for testing different pressure scenarios. In one embodiment, the throttle valve 30 is a ball valve.

The suction tubing 24 is connected to the pipe P1 at one end of the tubing and the compressor 12 at an opposite end of the tubing. Activation of the compressor 12 creates a suction within the suction tubing 24 to draw the natural gas from the pipe P1 through the suction tubing and into the compressor. An entrance pressure gauge 32 monitors the pressure of the gas in the suction tubing 24 to determine whether the pressure within the suction tubing is within an acceptable range. In one embodiment, a pressure range between about 0 and about 60 psig is considered within an acceptable range. However, the system 10 may be configured for other pressures without departing from the scope of the disclosure.

The gas in the suction tubing 24 will flow past the entrance pressure gauge 32 to an inlet regulator 34 (broadly, a regulator) configured to set the pressure within the suction tubing 24 to within the acceptable range. Thus, the inlet regulator 34 conditions the gas flowing through the suction tubing 24 to be suitable for compression by the compressor 12. For example, the inlet regulator 34 may set the pressure to be about 2 psig. By contrast, a conventional air compressor assembly incorporating an air compressor such as compressor 12 does not incorporate such a regulator valve because a conventional air compressor is configured for atmospheric air compression only. As such, the regulator would serve no purpose. However, in assembly 10, the regulator 34 ensures the natural gas is in a condition suitable for being compressed by the compressor 12. The regulated gas is then directed through the suction tubing 24 to the compressor 12. An inlet gauge 36 monitors the gas pressure to verify that the regulator 34 has properly regulated the gas pressure for use in the compressor 12. Alternatively, an inlet regulator bypass valve 38 is disposed along bypass tubing 39 that extends between sections of the suction tubing 24. The bypass tubing 39 and regulator bypass valve 38 allow the gas to flow around the regulator 34 to the compressor 12 and thus bypass the regulator.

A belt drive 40 connects the engine/motor 14 to the compressor 12. The belt drive 40 comprises a motor pulley 42, a compressor pulley 44, and a belt 46 connecting the compressor pulley to the motor pulley (FIG. 1). In one embodiment, a distance D between the pulleys 42, 44 is about 15 inches. However, the pulleys 42, 44 could be spaced apart other distances without departing from the scope of the disclosure. Activation of the engine/motor 14 causes rotation of the motor pulley 42 which pulls the belt 46 to rotate the compressor pulley 44. The rotation of the compressor pulley 44 turns or otherwise causes the motion of a compression mechanism in the compressor 12 to compress the natural gas flowing into the compressor. It will be understood that other connections between the engine/motor 14 and the compressor 12 may be used without departing from the scope of the disclosure.

Referring to FIG. 2, a manual unloading valve 48 is disposed between the suction tubing 24 at an inlet of the compressor 12 and discharge tubing 50 (broadly, a second tubing) at an outlet of the compressor. The unloading valve 48 provides advantages over a standard automatic valve used in conventional systems. For instance, the manual unloading valve 48 can be operated to redirect flow back to the inlet of the compressor 12 to short cycle the compressor by putting the compressor in a "no load" condition for facilitating starting the compressor. The manual unloading valve 48 may also minimize the power required by the motor 14 when the system pressure is at a level that may cause the motor to stall. In particular, when the unloading valve 48 is in the open position the valve has a very low resistance to flow past the valve. Thus, the pressure at the outlet end of the compressor will be low thereby reducing the power needed from the motor 14 for the compressor 12 to move gas flow through the compressor. Therefore, the manual unloading valve 48 may be placed in the open position for starting and idling to reduce the output required for operation. Alternatively, the manual unloading valve 48 may be replaced with a different type of valve or may be omitted without departing from the scope of the disclosure.

After being compressed within the compressor 12, gas leaving the outlet of the compressor flows though the discharge tubing 50. A check valve 52 is disposed along the discharge tubing 50 and is configured to prevent backflow during operation of the compressor 12. For instance, at starting and during compressor idling, the check valve 52 functions to prevent a backflow of gas into the outlet of the compressor 12. The check valve 52 may be omitted without departing from the scope of the disclosure.

Gas flowing past the check valve 52 can be drawn through a fuel line 54 extending from the discharge tubing 50 to the engine/motor 14. As will be understood by persons skilled in the art, the outlet side of the compressor 12 has a high gas pressures as a result of the compressed gas exiting the compressor. For example, the pressure of the gas flowing through the discharge tubing 50 at the outlet of the compressor 12 may range from about 20 to about 60 psig. In one embodiment, the gas pressure is about 25 psig. A fuel gas regulator (broadly, a first engine regulator) 56 is disposed along the fuel line 54 and functions to reduce the gas pressure of the gas flowing through the fuel line for use in the engine/motor 14. In one embodiment, the fuel gas regulator 56 is set to a water column gas pressure of 7-10 inches. The fuel gas regulator 56 could be set to other pressures without departing from the scope of the disclosure. An on-demand regulator (broadly, a second engine regulator) 58 is disposed along the fuel line 54 downstream of the fuel gas regulator 56. The on-demand regulator 58 is configured to sense suction from the engine/motor 14 and supply a volume of gas to the engine upon sensing the suction from the engine. The engine/motor 14 includes a venturi device (not shown) which creates a suction pressure that causes the on-demand regulator 58 to open so that the gas in the fuel line 54 is pulled through the fuel line to the engine. The natural gas flowing into the engine/motor 14 is used to power the engine. Thus, the assembly 10 configures the gasoline engine/motor 14 to run off natural gas. This allows a simple, inexpensive engine to be used within the assembly 10.

Gas flowing through the discharge tubing 50 that is not drawn into the fuel line 54 is directed to the outlet of the discharge tubing connected to the working pipe P2. A relief valve 60 is located along the discharge tubing 50 between the outlet of the compressor 12 and the outlet of the discharge tubing. The relief valve 60 serves as a safety feature to release pressure build-up caused by downstream valves to mistakenly be shut. Typical set pressure of the relief valve may be about 70 psig. A purge valve 62 is disposed along the discharge tubing 50 between the relief valve 60 and the outlet of the discharge tubing. The purge valve 62 allows air in the assembly 10 to be vented so that the tubing 24, 50 in the assembly is filled with substantially all gas. For instance, the purge valve 62 is operated so that the assembly 10 includes less than about 5% air. In one embodiment, the purge valve 62 is operated such that the assembly 10 includes 100% gas. In one embodiment, the purge valve 62 is opened after the assembly 10 is initially connected to the gas line GL to purge the air from the line.

An exit pressure gauge 64 monitors the pressure of the gas in the discharge tubing 50 flowing to the outlet of the discharge tubing to determine whether the pressure is within an acceptable range for being delivered to the pipe P2. An optional block valve 66 is disposed along the discharge tubing 50 between the purge valve 62 and the outlet of the discharge tubing 50 and can be used for testing different pressure scenarios. In one embodiment, the throttle valve 66 is a ball valve.

A gauge line 68 extends from the pipe P2 and provides a connection or tap point for the discharge tubing 50 to connect the assembly 10 to the pipe P2. A gauge line valve 70 is disposed on the gauge line 68 and operable to place the discharge tubing 50 in fluid communication with an interior of the pipe P2 for delivering the natural gas recovered from pipe P1 to pipe P2.

The drawdown compressor assembly 10 may also include additional features such as an emergency shutdown switch, suction and discharge filters, and an hour counter for maintenance scheduling. A blow-by gas line directed to the engine outlet may also be provided. Still other modifications and additions are envisioned without departing from the scope of the disclosure.

Figure 3:
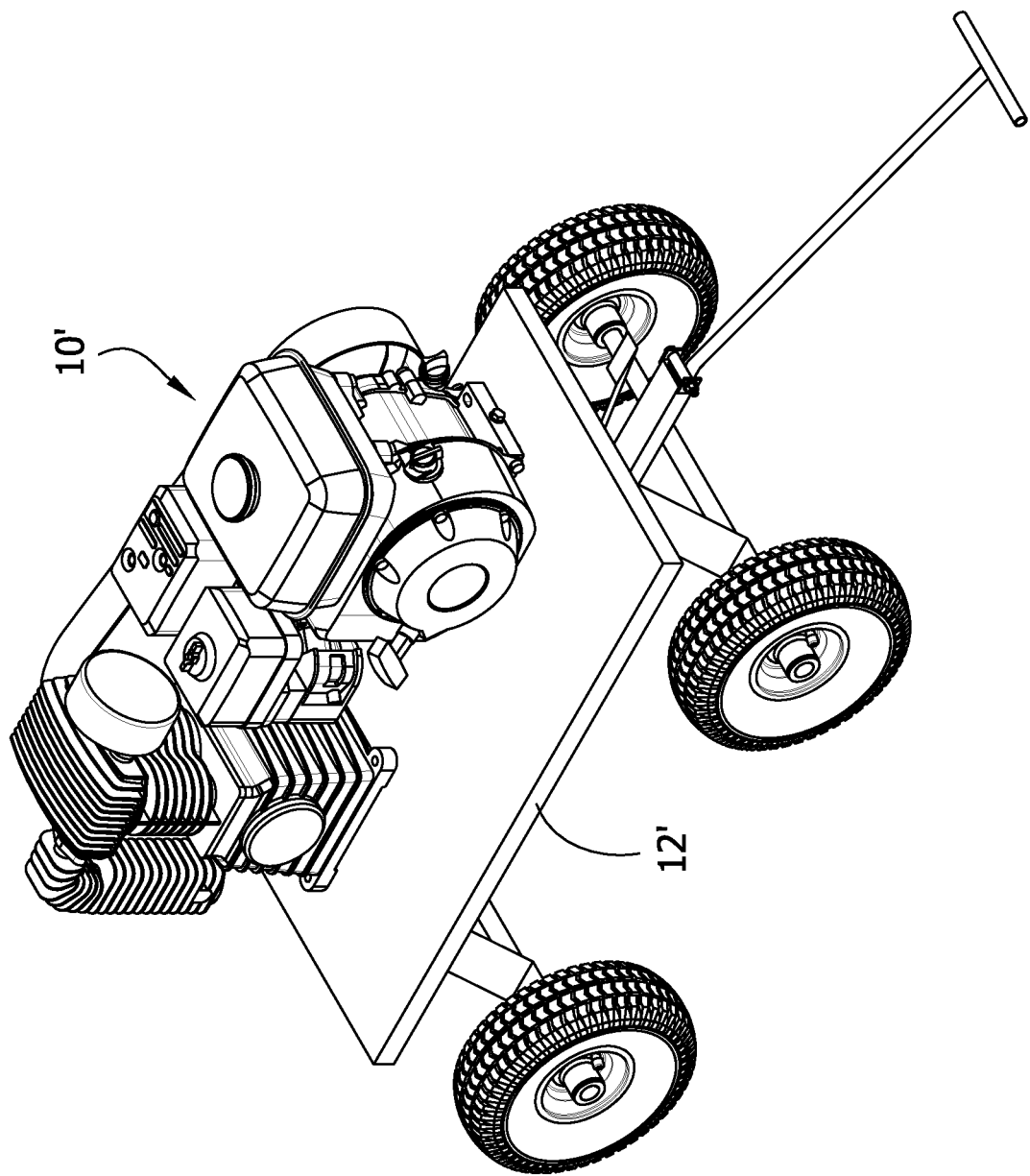
FIG. 3 is an illustration of another embodiment of a drawdown compressor assembly.
Figure 4:
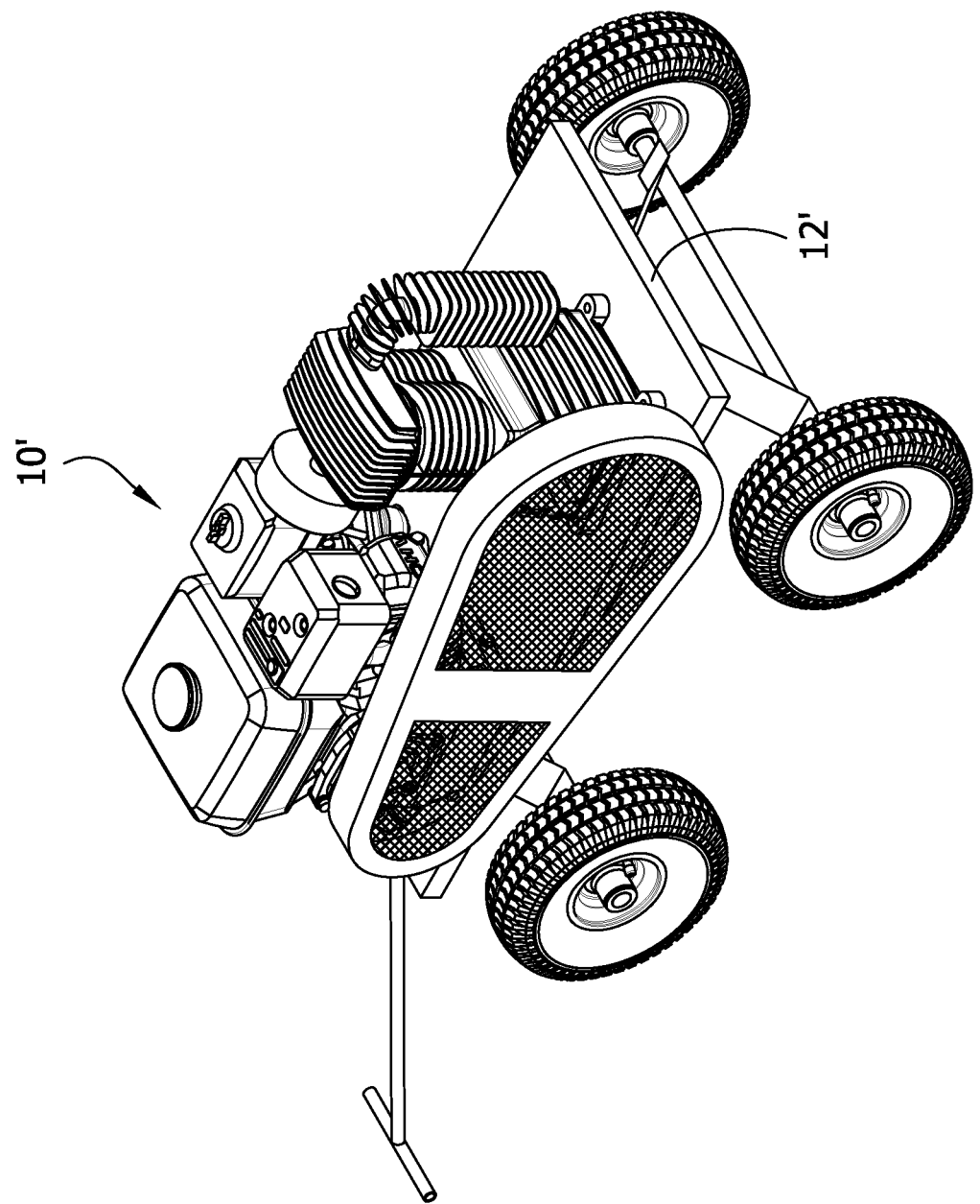
FIG. 4 is another illustration of the drawdown compressor assembly of FIG. 3.

Referring to FIGS. 3 and 4, a drawdown compressor assembly 10' is shown being carried by a wagon 12'. Thus, the housing 12 of assembly 10 is replaced with the wagon 12' for transporting the assembly 10' around. The assembly 10' otherwise operates in substantially the same way as the compressor assembly 10.

When introducing elements of the present invention or the preferred embodiment (s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description shall be interpreted as illustrative and not in a limiting sense.

What is claimed is:

1. A drawdown compressor assembly for recovering natural gas from a gas line, the assembly comprising:
    a first tubing configured for connection to a first pipe of the gas line at a one end of the first tubing;
    a compressor attached to an opposite end of the first tubing and configured to draw natural gas from the first pipe through the first tubing and into the compressor for being compressed by the compressor; and
    a second tubing connected to the compressor at one end of the second tubing and configured for connection to a second pipe of the gas line at an opposite end of the second tubing, activation of the compressor drawing the natural gas from the first pipe through the first tubing when the first tubing is connected to the first pipe and delivering compressed natural gas to the second pipe through the second tubing when the second tubing is connected to the second pipe, wherein the first and second pipes are part of the same gas line, the gas line having a passage extending from a first location upstream from a connection between the first pipe and the first tubing to a second location downstream from a connection between the second pipe and the second tubing such that gas may flow from the first location to the second location without passing the compressor.

2. The assembly of claim 1, further comprising a regulator disposed along the first tubing and configured to regulate the pressure of the natural gas within the first tubing to within a predetermined range.

3. The assembly of claim 2, further comprising bypass tubing extending between sections of the first tubing, and a bypass valve disposed along the bypass tubing, the bypass tubing allowing the natural gas in the first tubing to flow around the regulator to the compressor when the bypass valve is open.

4. The assembly of claim 1, further comprising a motor operatively connected to the compressor for driving the compressor.

5. The assembly of claim 4, further comprising a fuel line connected to the second tubing at one end of the fuel line and the motor at an opposite end of the fuel line, the motor drawing natural gas in the second tubing through the fuel line and into the motor for powering the motor.

6. The assembly of claim 5, further comprising an engine regulator disposed along the fuel line and configured to reduce the pressure of the natural gas flowing through the fuel line for use in the motor.

7. The assembly of claim 6, wherein the engine regulator comprises a first engine regulator, the assembly further comprising a second engine regulator disposed along the fuel line and configured to sense suction from the motor and supply a volume of natural gas to the motor upon sensing suction from the motor.

8. The assembly of claim 4, wherein the motor is a gasoline motor.

9. The assembly of claim 1, further comprising a manual unloading valve disposed between the first and second tubing and configured to redirect gas flow from an outlet of the compressor back to an inlet of the compressor to short cycle the compressor for facilitating starting the compressor.

10. The assembly of claim 1, further comprising a purge valve disposed along the second tubing for venting air from the assembly.

11. The assembly of claim 1, further comprising a housing at least partially enclosing the compressor, the housing having a maximum length of about 4 feet, a maximum width of about 2 feet, and a maximum height of about 2 feet.

12. The assembly of claim 1, wherein the compressor comprises a retrofit air compressor configured to function as a gas compressor.

13. A process of recovering natural gas from a gas line comprising:
drawing natural gas from a first pipe of the gas line through a first tubing;
compressing the natural gas with a compressor attached to the first tubing at an inlet of the compressor; and
delivering the compressed natural gas to a second pipe of the gas line through a second tubing connected to an outlet of the compressor, wherein the first and second pipes are part of the same gas line, the gas line having a passage extending from a first location upstream from a connection between the first pipe and the first tubing to a second location downstream from a connection between the second pipe and the second tubing such that gas may flow from the first location to the second location without passing the compressor.

14. The method of claim 13, further comprising regulating the pressure of the natural gas within the first tubing to within a predetermined range.

15. The method of claim 13, further comprising drawing natural gas in the second tubing through a fuel line connected to a motor for powering the motor to drive the compressor.

16. The method of claim 15, further comprising regulating the pressure of the natural gas flowing through the fuel line.

17. The method of claim 13, further comprising venting air from the first and second tubing prior to drawing natural gas from the first pipe.

18. The method of claim 13, wherein the compressor comprises a retrofit air compressor configured to function as a gas compressor.

19. A drawdown compressor assembly for recovering natural gas from a gas line, the assembly comprising:
a first tubing configured for connection to a first pipe of the gas line at a one end of the first tubing;
a compressor attached to an opposite end of the first tubing and configured to draw natural gas from the first pipe through the first tubing and into the compressor for being compressed by the compressor;
a second tubing connected to the compressor at one end of the second tubing and configured for connection to a second pipe of the gas line at an opposite end of the second tubing, activation of the compressor drawing the natural gas from the first pipe through the first tubing when the first tubing is connected to the first pipe and delivering compressed natural gas to the second pipe through the second tubing when the second tubing is connected to the second pipe;
a regulator disposed along the first tubing and configured to regulate the pressure of the natural gas within the first tubing to within a predetermined range; and
bypass tubing extending between sections of the first tubing, and a bypass valve disposed along the bypass tubing, the bypass tubing allowing the natural gas in the first tubing to flow around the regulator to the compressor when the bypass valve is open.

20. A drawdown compressor assembly for recovering natural gas from a gas line, the assembly comprising:
a first tubing configured for connection to a first pipe of the gas line at a one end of the first tubing;
a compressor attached to an opposite end of the first tubing and configured to draw natural gas from the first pipe through the first tubing and into the compressor for being compressed by the compressor;
a second tubing connected to the compressor at one end of the second tubing and configured for connection to a second pipe of the gas line at an opposite end of the second tubing, activation of the compressor drawing the natural gas from the first pipe through the first tubing when the first tubing is connected to the first pipe and delivering compressed natural gas to the second pipe through the second tubing when the second tubing is connected to the second pipe; and
a manual unloading valve disposed between the first and second tubing and configured to redirect gas flow from an outlet of the compressor back to an inlet of the compressor to short cycle the compressor for facilitating starting the compressor.

* * * * *